July 5, 1955     I. S. EGGLESTON     2,712,378
CONVEYOR BELT GUIDING DEVICE
Filed May 27, 1950     2 Sheets-Sheet 1
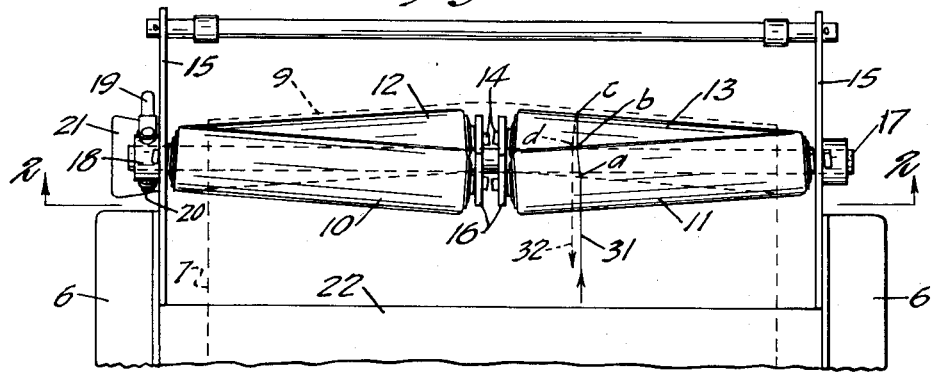
Fig. 1
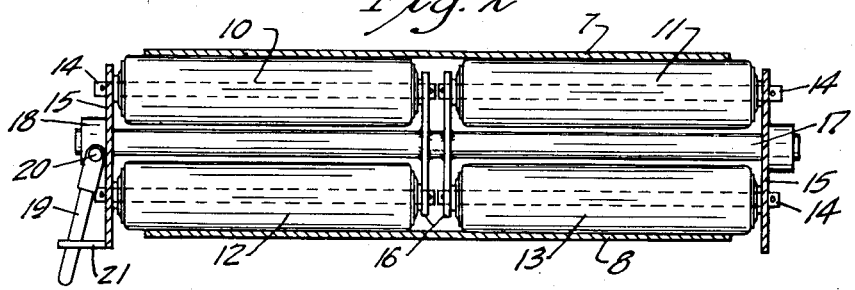
Fig. 2
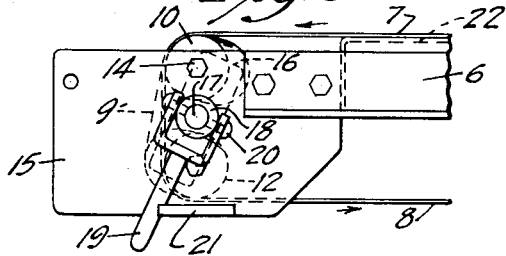
Fig. 3
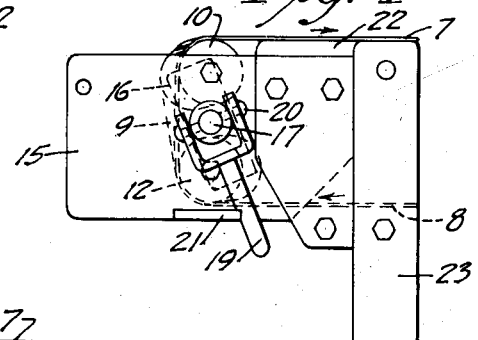
Fig. 4
Fig. 5
Inventor
Ira S. Eggleston
By John E. Stryker
Attorney July 5, 1955      I. S. EGGLESTON      2,712,378
CONVEYOR BELT GUIDING DEVICE
Filed May 27, 1950      2 Sheets-Sheet 2
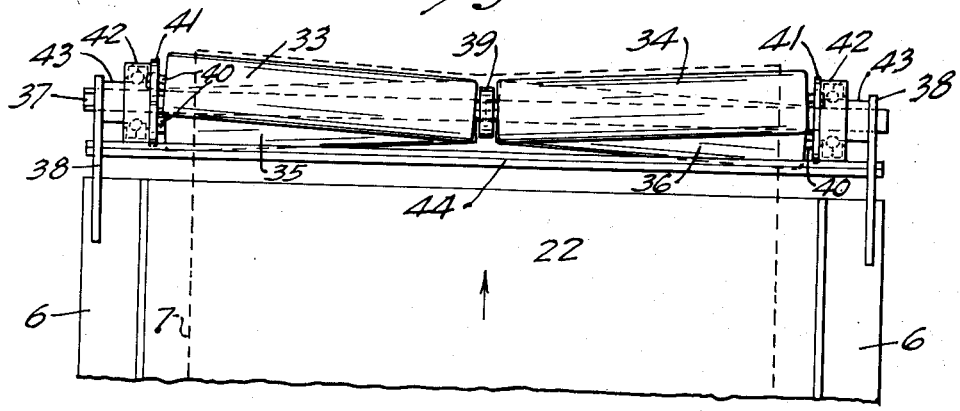
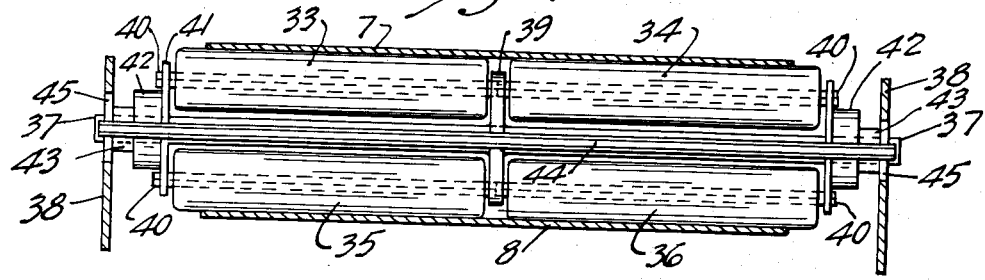
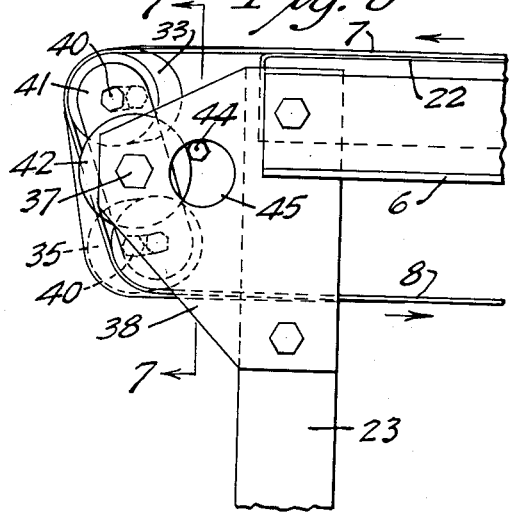 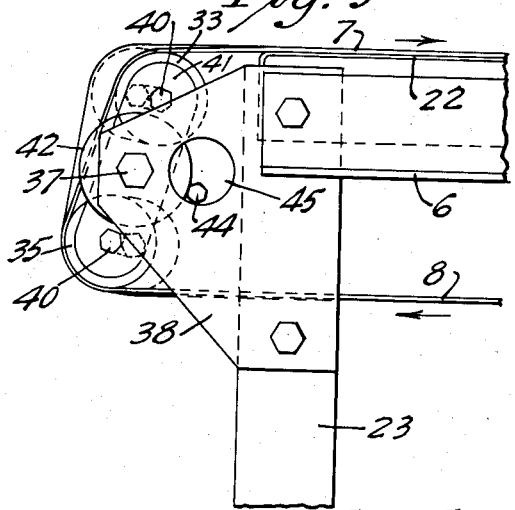
Inventor
Ira S. Eggleston
By John E. Hughes
Attorney

2,712,378
CONVEYOR BELT GUIDING DEVICE

Ira S. Eggleston, St. Paul, Minn., assignor to Standard Conveyor Company, North St. Paul, Minn., a corporation of Minnesota Application May 27, 1950, Serial No. 164,778

18 Claims. (Cl. 198—202)

This invention relates to devices for controlling the direction of travel of conveyor belts and for biasing or actuating them toward a central or other predetermined path of travel and particularly to a system of supporting and guiding rollers adapted to engage such belts at the junction of their upper and lower reaches to retain them in the desired, usually central, position in relation to the supporting frame and to overcome and correct the natural tendency of many conveyor belts to move to one side or the other of the correct line of travel.

Heretofore, much difficulty has been experienced in attempts to properly guide certain types of belts, including the wider and longer conveyor belts, and to cause them to track or travel in proper centered relation to the supporting frame and rotary guiding members. The present device solves the long existing problem involving the guiding of end portions of conveyor belt reaches where their direction of travel is reversed or where they pass over and are partially wrapped upon a drum or other rotary guide member. Crowned drums and guide rollers angularly disposed to the direction of travel of the belts have been used with some degree of success with the narrower belts and where the direction of travel is in one direction only, but many other belts, due to internal stress, or for some other reason not fully understood, have a strong tendency to run toward one side or the other of the normal or intended direction of travel. Such belts cannot be satisfactorily controlled by crowned drums or by conventional arrangements of guide rollers and under many conditions of use have caused serious operational difficulties. The resulting problem and guiding difficulties have been most serious where the direction of operation of the belts must be reversed from time to time. Ordinary angular adjustments of the guide rollers which tend to correct the natural tendency of a particular belt to run to one side when traveling in one direction cause the belt to be thrown completely out of line when the direction of operation is reversed. Time does not permit readjustment of conventional guide rollers whenever the direction of operation is reversed.

It is an object of my invention to provide novel and effective means for properly guiding that portion of a conveyor belt which extends between the upper and lower reaches thereof whereby the common tendency of belts to run to one side or the other at the end of a reach may be overcome with a minimum of effort on the part of the operator.

A particular object is to provide for a conveyor belt having upper and lower reaches, novel guiding and centering means comprising a plurality of pairs of rollers disposed to engage and guide that portion of the belt which extends between its upper and lower reaches, the rollers of each pair extending crosswise of the belt, obliquely of its direction of travel and at an obtuse angle one to the other, and the outer end portions of the several rollers being disposed to lead the respective inner end portions thereof in the direction of travel of the belt.

Another object is to provide a belt guiding device of the class described which is operative automatically when the direction of travel of the belt is reversed to change the angle of the guiding rollers and cause the outer end portions of these rollers to lead their respective inner end portions in the direction of travel of the belt and at the desired angle crossways of the belt.

A further and particular object is to provide in a device of the class described, a plurality of pairs of supporting and guiding rollers upon which the conveyor belt is partially wrapped and means for quickly and easily adjusting or changing the angular positions of the several rollers relative to the belt and conveyor frame so that when the direction of travel of the belt is reversed the angular positions of the several rollers may be reversed instantaneously.

Other objects will appear and be more fully pointed out in the following specification and claims.

Referring to the accompanying drawings, which illustrate by way of example and not for the purpose of limitation, certain embodiments of my invention:

Figure 1 is a plan view of an end portion of a belt conveyor embodying a simple form of the present invention, the position of the belt being indicated in broken lines;

Fig. 2 is a vertical sectional view taken approximately on the line 2—2 of Fig. 1;

Fig. 3 is a side elevational view showing the same form of my device as adjusted for travel of the belt in one direction;

Fig. 4 is a side elevational view showing the same form adjusted for belt operation in the reverse direction;

Fig. 5 is a diagrammatic side elevational view showing a modified form of the invention particularly adapted to accommodate a heavy belt and to afford more gradual flexing or bending of the belt in engagement with the guide rollers;

Fig. 6 is a top plan view illustrating a preferred form of my device, with the location of the belt indicated in broken lines and showing an end portion of the conveyor frame and belt supporting plate;

Fig. 7 is a vertical sectional view taken approximately on the line 7—7 of Fig. 8, with the rollers in their parallel or neutral positions;

Fig. 8 is a side elevational view illustrative of the preferred form of the invention and showing the guide rollers in one of the operative positions, and Fig. 9 is a view similar to Fig. 8 but with the guide rollers in another position for belt operation in the reverse direction as compared with the direction of operation indicated in Fig. 8.

In the drawings the numeral 6 indicates the parallel side rails of a belt conveyor frame of common type. These rails are rigidly connected together by suitable cross members to afford an elongated support for an endless conveyor belt having an upper reach indicated by the numeral 7, a lower reach indicated by the numeral 8 and a portion 9 extending from the upper reach to the lower reach. As shown in Figs. 1–4, rollers 10, 11, 12 and 13 are provided upon which the conveyor belt is trained. Each of these rollers is disposed to extend obliquely crosswise of the direction of travel of the belt and the rollers of each pair extend laterally outward from the vertical median plane between the side rails 6. These rollers have cylindrical peripheries and the rollers 10 and 11 constitute one pair, disposed end to end, and the rollers 12 and 13 constitute another pair similarly disposed one relative to the other. The rollers of each pair normally extend at an obtuse angle one to the other and their outer ends, adjoining the side frame members, are normally arranged to lead their respective inner ends in the direction of travel of the belt. Arrows indicate the direction of travel of the belt in the several views.

The several rollers 10–13 are freely revoluble on axially disposed shafts 14, the outer ends of which fit loosely in openings formed in side frame members 15 and the inner ends of which are supported on arms 16. These arms are in turn rigidly fastened, by welding or otherwise, to a shaft 17 extending across the conveyor frame and having suitable bearings in the frame members so that the shaft may be oscillated about its longitudinal axis to adjust the angular positions of the rollers 10–13 simultaneously. At one end the shaft 17 is fitted with a collar 18 which is fixed thereon and provided with a readily accessible handle 19 for oscillating the shaft. The handle 19 is connected to the collar 18 by a pair of studs 20 which permit the handle to be swung outward to pass a detent plate 21 fixed on and projecting outward from one of the frame members 15. As shown, the upper reach 7 of the conveyor belt is slidably supported on a plate 22 extending between and supported on the rails 6. The conveyor frame may be supported at a suitable elevation on legs 23 as shown in Fig. 4.

The number of pairs of guide rollers for the portion 9 of the belt may be increased as compared with the simple form of the invention shown in Figs. 1–4 inclusive. For example, as shown diagrammatically in Fig. 5, four pairs of guide rollers indicated respectively by the numerals 24, 25, 26 and 27 may be arranged to engage and guide the belt. These rollers are severally revoluble on guide the belt. These rollers are severally revoluble on axial shafts 28, the inner or centrally located ends of which are mounted on arms 29 fixed on a horizontally extending shaft 30. This shaft, like the shaft 17, is supported on side frame members of the conveyor and is free for oscillating movement about its axis so that the angular positions of the several rollers 24–27 and their respective supporting shafts 28 relative to the conveyor frame and belt may be adjusted. By this arrangement, the conveyor belt is caused to engage segments of the peripheries of each of the eight guide rollers and each segment of contact is approximately equal to 45 degrees of the roller circumference. This compares with a contact segment on each of the four rollers in the arrangement shown in Figs. 1–4 equal to approximately 90 degrees of each roller circumference. An arrangement such as that shown in Fig. 5 or having a greater or smaller number of pairs of guide rollers may be desirable where thick or heavy belts are employed or where relatively abrupt angular bending of the belt is undesirable.

Referring to the preferred form of the invention illustrated in Figs. 6, 7, 8 and 9, the several guide rollers are indicated by the numerals 33, 34, 35 and 36. These rollers are supported on a shaft 37 which extends crosswise of the conveyor frame and is rigidly supported on a pair of side plates 38 projecting from the end of the conveyor frame. The shaft 37 is of non-circular shape in cross section and is held against rotation in the supporting plates 38. Fixed on the shaft 37, midway between the plates 38, is a flat bar 39 which supports the inner ends of the several rollers 33, 34, 35 and 36. Each of these rollers is revolubly mounted on an axial shaft 40 having one end fitting loosely in a bearing socket in the bar 39 and the other end supported on a flat bar 41 which is free for limited oscillating movement about the axis of the shaft 37. An anti-friction bearing 42 is mounted coaxially on a shaft 37 adjacent to each of the supporting plates 38 and each of these bearings has rigidly secured to the rotary part thereof one of the bars 41. A non-revoluble inner race member 43 of each bearing 42 is fitted to the shaft 37 and projects for engagement with the adjacent supporting plate 38.

Sufficient clearance or play is provided for between the several shafts 40 and their supporting bars 39 and 41 to permit the desired angular movement of the guide rollers relative to the vertical median plane of the conveyor. The rotary parts of the bearings 42 are rigidly connected together for oscillating movement in unison by a rod 44 which is welded or otherwise fixed to the outer peripheries of these rotary parts. Each end portion of the rod 44 projects through an opening 45 in the adjacent plate 38 so that oscillating movement of the rotary bearing members and outer ends of the bars 41 carried thereby is limited by engagement of the end portions of the rod 44 with stop surfaces defined by the openings 45. Thus the movable parts of the bearings 42 and outer end portions of the rods 40 supporting the rollers are freely movable from a position such as that indicated in Fig. 8 to a position such as that shown in Fig. 9 in each of which positions the outer ends of the rollers 33, 34, 35 and 36 lead their inner ends in the direction of travel of the belt.

In operation the conveyor belt is normally driven in a predetermined direction by power applied thereto in suitable or conventional manner. Where it is driven in the direction indicated by arrows in Figs. 1 and 3, the handle 19 is moved to engage the left side (Fig. 3) of the detent plate 21 thereby oscillating the shaft 17 and moving the inner ends of the rollers 10–13 clockwise relative to their outer ends and the direction of travel of the belt. Such angular positioning of the several guide rollers biases the belt toward a properly centered position.

The effect on the belt is illustrated graphically in Fig. 1 where the path of travel of a point on the belt is indicated by the lines 31 and 32. A point on the lower side of the reach 7 will travel along the line 31 until it makes contact with the upper periphery of the roller 11 at a point $a$ and from this point is urged by frictional contact with the roller obliquely to the left until the point on the belt passes out of contact with roller 11 at point $b$. From point $b$, the point on the belt tends to move substantially parallel to the frame members 15 until it makes contact at point $c$ with the roller 13 and is carried in contact with this roller until it reaches the lower periphery thereof at a point such as that indicated at $d$, obliquely to the left or toward the center of the conveyor from the point $a$ of contact with the roller 11. It will thus be evident that the point on the belt referred to has a tendency to leave the lower periphery of the roller 13 and to move along the broken line 32 representing its path of travel on the return or lower reach of the belt. All other points of contact on the belt surface are similarly urged by contact with the several guide rollers 10–13 toward the longitudinal center plane of the conveyor. In operation, even belts having a strong tendency to run toward either side of the conveyor are straightened and caused to move in properly centered relation thereto.

When the direction of travel of the belt is reversed, as indicated in Fig. 4, the handle 19 is actuated to reverse the angular position of the several rollers as further indicated in Fig. 4. This results in the proper centering of the belt for reverse operation. Ordinarily, a suitable angle for the axes of the several guide rollers relative to the direction of travel of the belt may be from 3 to 10 degrees, depending upon the width of the belt, its inherent tendency to run to one side or the other and the tension under which it is operated.

Instead of employing manually operable means for changing the angle of the belt guiding rollers, they may be operatively connected to an electric switch or other mechanism for reversing the direction of travel of the conveyor belt so that the angular positions of the guiding rollers may be coordinated automatically with the reversal of the belt movement. A preferred mechanism for automatically changing the angles of the guide rollers is that illustrated in Figs. 6–9.

In the operation of the preferred form of my device, the changing of the angular positions of the rollers 33, 34, 35 and 36 is effected automatically by the direction of the pull of the belt and pressure of the belt on these rollers so that their angular positions are changed whenever the direction of travel of the belt is changed. Thus when the belt is traveling in the direction indicated by arrows in Fig. 8, the outer end portions of the rollers 33, 34, 35 and 36 are drawn forward in the direction of travel of the belt while their inner end portions are prevented from moving by the fixed supporting bar 39 which projects above and below the fixed shaft 37. Such angular movement of the guide rollers is limited by contact of the rod 44 with the surfaces of the plate 38 defined by the upper peripheries of the openings 45. This rod 44, being connected to both of the movable parts of the bearings 42, also causes the bars 41 supporting the outer ends of the several rollers to stop in predetermined position and to maintain the axes of the rollers 33 and 34 at equal angles to the vertical median plane at the conveyor. Angular movement of the rollers 35 and 36 is similarly controlled and limited by the rod 44. When the direction of travel of the belt is reversed, as indicated in Fig. 9, the several guiding rollers are automatically shifted, as indicated, to maintain the desired angular lead of the outer ends of all of these rollers.

It will be evident, as in the form of my device described with reference to Fig. 5, that more than two pairs of guide rollers may be arranged to support the bend portion of a conveyor belt and to be automatically actuated to various predetermined angular positions, depending on the direction of travel of the belt and the particular conditions under which the belt is designed to operate, whereby proper centering or tracking of the belt may be insured.

The present device has been used with outstanding success in guiding belts which are difficult to guide and center, such as those which are operated under extremely low tension, those of great length and/or width or where it is not feasible to afford ordinary angularly disposed supporting and guiding rollers, or where side edge guides cannot be used because the packages to be handled are of such size as to overhang the side edges, being wider than the belt. Further advantages are derived from the use of the present device because it minimizes stresses in and wear on the belts.

This application is, in part, a continuation of my application Serial No. 71,355, filed January 17, 1949, and now abandoned.

Having described my invention, what I claim as new and desire to protect by Letters Patent is:

1. For a conveyor belt, improved guiding means comprising, a plurality of pairs of guide rollers disposed to severally engage concave surfaces of arcuate portions of said belt extending along the direction of travel of the belt, the rollers of each pair extending laterally outward from the longitudinal median plane of the belt and having their axes of rotation disposed at an obtuse angle one to the other and the outer end portions of the several rollers being disposed to lead their respective inner end portions in the direction of travel of the belt whereby points on the surface of the belt in contact with said rollers are urged obliquely toward the longitudinal median plane of the belt.

2. For a conveyor belt having upper and lower reaches, improved guiding means comprising, a plurality of pairs of guide rollers disposed to severally engage the bottom surface of the upper reach and upper surface of the lower reach of said belt at the ends of the respective reaches thereof, the rollers of each pair being disposed end to end, obliquely, crosswise of the direction of travel of the belt and having their axes of rotation disposed at an obtuse angle one to the other and the outer end portions of the several rollers being disposed to lead their respective inner end portions in the direction of travel of the belt.

3. For a conveyor belt, improved guiding means comprising, a plurality of pairs of elongated substantially cylindrical guide rollers disposed to severally engage concave surfaces of spaced arcuate portions of said belt extending along the direction of travel of the belt, the rollers of each pair extending laterally outward from the longitudinal median plane of said belt and having axes of rotation extending at an obtuse angle one to the other, a substantially fixed support for one end of each of said rollers and a movable support for the opposite end of each of said rollers whereby the angle of the several rollers relative to the belt may be changed to cause their respective outer ends to lead their inner ends in the direction of travel of the belt.

4. In combination with a longitudinally movable belt, a plurality of pairs of elongated substantially cylindrical guide rollers disposed to severally engage concave surfaces of spaced arcuate portions of said belt extending along the direction of travel of the belt, the rollers of each pair extending laterally outward from the longitudinal median plane of said belt and having axes of rotation extending at an obtuse angle one to the other, a substantially fixed support for one end of each of said rollers, a movable support for the opposite end of each of said rollers, and means for actuating said movable support to cause the outer end portions of the several rollers to lead their inner end portions respectively in the direction of travel of the belt.

5. For a conveyor having an elongated frame and a conveyor belt movable along said frame, the improvements which comprise, a plurality of pairs of elongated guide rollers disposed to severally engage concave surfaces of spaced arcuate portions of said belt extending along the direction of travel of the belt, a shaft carried by said frame, the rollers of each pair extending laterally outward from the longitudinal median plane of the conveyor and having axes of rotation disposed at an obtuse angle one to the other, a substantially fixed support for one end of each of said rollers, a movable support for the opposite end of each of said rollers operatively connected to said shaft and means for actuating said shaft to simultaneously change the angle of the several rollers relative to the frame and belt.

6. For a conveyor having an elongated frame and a conveyor belt movable along said frame and having upper and lower reaches, the improvements which comprise, a plurality of pairs of elongated guide rollers disposed to severally engage a portion of said belt extending between the upper and lower reaches thereof, a supporting shaft for an end of each of said rollers mounted for oscillating movement on said frame between the upper and lower reaches of said belt and extending crosswise thereof, the rollers of each pair extending laterally outward from the longitudinal median plane of said belt, a substantially fixed support for one end of each of said rollers, a movable support for the opposite end of each of said rollers fixed on said shaft and means for oscillating said shaft to cause the outer end portions of the several rollers to lead their inner end portions respectively in the direction of travel of the belt.

7. For a conveyor having an elongated frame and a conveyor belt movable along said frame and having upper and lower reaches, the improvements which comprise, a plurality of pairs of elongated substantially cylindrical guide rollers disposed to severally engage a portion of said belt extending between the upper and lower reaches thereof, a supporting shaft for an end of each of said rollers mounted for oscillating movement on said frame midway between the upper and lower reaches of said belt and extending crosswise thereof, the rollers of each pair extending laterally outward from the longitudinal median plane of the conveyor, a substantially fixed support on said frame for one end of each of said rollers, a movable support for the opposite end of each of said rollers fixed on said shaft and projecting radially therefrom and means for oscillating said shaft to change the angle of the several rollers relative to the frame and belt.

8. For a conveyor having an elongated frame and a conveyor belt movable along said frame and having upper and lower reaches, the improvements which comprise, a plurality of pairs of elongated substantially cylindrical guide rollers disposed to severally engage a portion of said belt extending between the upper and lower reaches thereof, a supporting shaft for an end of each of said rollers mounted for oscillating movement on said frame midway between the upper and lower reaches of said belt and extending crosswise thereof, the rollers of each pair extending laterally outward from the longitudinally median plane of the conveyor, a substantially fixed support on said frame for the outer end of each of said rollers, a movable support for the inner end of each of said rollers fixed on said shaft and projecting radially therefrom, a handle operatively connected to said shaft for changing the angle of the several rollers relative to the frame and belt and means for securing said rollers in adjusted angular positions relative to the belt and conveyor frame.

9. For a reversible conveyor belt improved guiding means comprising, a plurality of pairs of guide rollers disposed to severally engage concave surfaces of arcuate portions of said belt, the rollers of each pair extending laterally outward from the longitudinal median plane of the belt and being relatively movable to extend at various angles relative to said median plane, and automatically operative means for causing the outer end portions of the several rollers to lead their respective inner end portions in the direction of travel of the belt.

10. For a reversible conveyor belt improved guiding means comprising, a plurality of pairs of guide rollers disposed to severally engage concave surfaces of spaced arcuate portions of said belt, the rollers of each pair extending laterally outward from the longitudinal median plane of the belt and being angularly movable to extend at various angles relative to said median plane, and means adapted to be actuated by the pressure exerted by the belt on said rollers for causing the outer end portions of the several rollers to lead their respective inner end portions in the direction of travel of the belt.

11. For a conveyor belt the improvements which comprise a plurality of pairs of elongated guide rollers disposed to severally engage concave surfaces of spaced arcuate portions of said belt, the rollers of each pair extending laterally outward from the longitudinal median plane of said belt, a substantially fixed support for the inner end of each of said rollers, and a movable support for the outer end of each of said rollers whereby the angle of said rollers relative to said median plane may be changed and the outer end portions of the several rollers are caused to lead their inner end portions respectively in the direction of travel of the belt.

12. The device defined in claim 11 wherein said belt is reversible and said movable supports are arranged to be actuated by pressure exerted by the belt on said rollers to change the angle of the rollers when the direction of travel of the belt is reversed.

13. For a conveyor having an elongated frame and a reversible conveyor belt movable along said frame and having upper and lower reaches, the improvements which comprise, a plurality of pairs of elongated guide rollers disposed to severally engage a bend portion of said belt extending between the upper and lower reaches thereof, the rollers of each pair extending laterally outward from the longitudinal median plane of the conveyor, a substantially fixed support for the inner ends of said rollers, movable supports for the outer ends of said rollers freely oscillatable about an axis extending midway between the upper and lower reaches of the belt, whereby the angular positions of said rollers relative to said median plane may be changed and means for limiting oscillating movement of said movable supports to retain said rollers in selected angular positions in which their outer ends lead their inner ends in the direction of travel of the belt.

14. The device defined in claim 13 in which said fixed support for the inner ends of said rollers comprises a shaft rigidly connected to said frame and affording an axial support for said movable supports for the outer ends of the rollers.

15. The device defined in claim 13 in which said movable supports for the outer ends of the rollers are rigidly connected together for oscillating movement in unison.

16. In combination with a longitudinal movable belt, a pair of guide rollers disposed end to end crossways of said belt in frictional contact with substantial concave surfaces of said belt extending along the direction of travel of the belt, said rollers extending laterally outward from the longitudinal median plane of the belt and having axes of rotation disposed at an obtuse angle one to the other, the outer end portions of the respective rollers being disposed to lead their inner end portions in the direction of travel of the belt whereby points on the surface of the belt in contact with said rollers are urged obliquely toward the longitudinal median plane of the belt.

17. The device defined in claim 16 wherein a substantially fixed support is provided for one end of each of said rollers and a movable support for the opposite end of each of said rollers, whereby the angles of the rollers relative to the median plane of the belt may be changed.

18. In combination with a longitudinally movable belt, a pair of elongated substantially cylindrical guide rollers disposed end-to-end crossways of said belt in frictional contact with substantial concave surfaces of said belt extending along the direction of travel of the belt and not exceeding in length one-half of the circumference of each of the rollers, said rollers extending laterally outward from the longitudinal median plane of the belt and having axes of rotation disposed at an obtuse angle one to the other, the outer end portions of the respective rollers being disposed to lead their inner end portions in the direction of travel of the belt.

References Cited in the file of this patent

UNITED STATES PATENTS

| | | |
|---|---|---|
| 169,573 | Parr | Nov. 2, 1875 |
| 878,815 | Martin | Feb. 11, 1908 |
| 1,927,849 | Roberts | Sept. 26, 1933 |
| 2,024,618 | Whiting | Dec. 17, 1935 |
| 2,198,656 | Cohn et al. | Apr. 30, 1940 |